(12) United States Patent
Baldreich (10) Patent No.: US 12,163,609 B2
(45) Date of Patent: Dec. 10, 2024

(54) PLUG CONNECTOR FOR CONNECTING LINES FOR LIQUID OR GASEOUS MEDIA

(71) Applicant: Henn GmbH & Co KG., Dornbirn (AT)

(72) Inventor: Wolfgang Baldreich, Hoerbranz (AT)

(73) Assignee: Henn GmbH & Co KG., Dornbirn (AT)

(*) Notice: Subject to any disclaimer, the term of this patent is extended or adjusted under 35 U.S.C. 154(b) by 266 days.

(21) Appl. No.: 17/633,041

(22) PCT Filed: Sep. 1, 2020

(86) PCT No.: PCT/AT2020/060327
§ 371 (c)(1),
(2) Date: Feb. 4, 2022

(87) PCT Pub. No.: WO2021/042148
PCT Pub. Date: Mar. 11, 2021

(65) Prior Publication Data
US 2022/0275894 A1 Sep. 1, 2022

(30) Foreign Application Priority Data
Sep. 3, 2019 (AT) .............................. A 50768/2019

(51) Int. Cl.
*F16L 37/088* (2006.01)
(52) U.S. Cl.
CPC ....... *F16L 37/0885* (2019.08); *F16L 2201/10* (2013.01)
(58) Field of Classification Search
CPC .. F16L 37/0885; F16L 2201/10; F16L 37/088
See application file for complete search history.

(56) References Cited

U.S. PATENT DOCUMENTS 8,240,716 B2   8/2012  Kerin et al.
8,336,919 B2  12/2012  Gillet et al.
(Continued)

FOREIGN PATENT DOCUMENTS

AT     509 196 B1     7/2011
EP   2 251 581 A1    11/2010
(Continued)

OTHER PUBLICATIONS

International Search Report in PCT/AT2020/060327, mailed Nov. 30, 2020.

*Primary Examiner* — James M Hewitt, II
(74) *Attorney, Agent, or Firm* — Collard & Roe, P.C.

(57) ABSTRACT

A plug connector for connecting lines for liquid or gaseous media, includes a connector body and a locking element for securing the plug connector relative to a mating plug connector. Moreover, an indicator element and a guide receptacle for receiving the indicator element in a displaceable manner are formed, wherein the indicator element is received in the guide receptacle such that the indicator element is displaceable between a rest position and an indicator position, wherein the indicator element has an indicator surface, which is visible in the indicator position of the indicator element and, in the rest position of the indicator element, is at least partially concealed, wherein the indicator surface, when it is visible, serves to signal that the plug connector is plugged into the mating plug connector correctly, and/or that the locking element is locked correctly.

16 Claims, 7 Drawing Sheets

(56) References Cited

U.S. PATENT DOCUMENTS

| | | | |
|---|---|---|---|
| 8,997,328 B2 | 4/2015 | Hartmann et al. | |
| 10,641,162 B2 | 5/2020 | Baldreich et al. | |
| 10,927,990 B2 | 2/2021 | Baldreich et al. | |
| 11,131,411 B2 | 9/2021 | Gaurat et al. | |
| 11,480,277 B2* | 10/2022 | Trotter | F16L 37/0885 |
| 2008/0279621 A1 | 11/2008 | Chaupin | |
| 2018/0299050 A1* | 10/2018 | Baldreich | F16L 37/0885 |
| 2019/0040982 A1 | 2/2019 | Cantrell et al. | |
| 2020/0355308 A1* | 11/2020 | Hunt | F16L 37/144 |
| 2021/0285581 A1* | 9/2021 | Rydin | F16L 37/0885 |
| 2021/0364112 A1* | 11/2021 | Barthel | F16L 37/0885 |

FOREIGN PATENT DOCUMENTS

| | | |
|---|---|---|
| EP | 3 179 148 A1 | 6/2017 |
| EP | 3 527 867 A1 | 8/2019 |
| EP | 3667147 A1 | 6/2020 |
| JP | H03280370 A | 12/1991 |
| JP | 2004211891 A | 7/2004 |
| JP | 2010038365 A | 2/2010 |
| JP | 2011033056 A | 2/2011 |
| JP | 2018535524 A | 11/2018 |
| KR | 10-2018-0099630 A | 9/2018 |
| KR | 10-2018-0099631 A | 9/2018 |
| KR | 101966161 B1 | 4/2019 |
| WO | 2006/099933 A1 | 9/2006 |
| WO | 2011/106805 A1 | 9/2011 |
| WO | 2011/140280 A2 | 11/2011 |
| WO | 2017091500 A1 | 6/2017 |
| WO | 2018/102213 A1 | 6/2018 |
| WO | 2018/144902 A1 | 8/2018 |
| WO | 2019/036233 A1 | 2/2019 |
| WO | 2019/126447 A1 | 6/2019 |

\* cited by examiner

PLUG CONNECTOR FOR CONNECTING LINES FOR LIQUID OR GASEOUS MEDIA

CROSS REFERENCE TO RELATED APPLICATIONS

This application is the National Stage of PCT/AT2020/060327 filed on Sep. 1, 2020, which claims priority under 35 U.S.C. § 119 of Austrian Application No. A50768/2019 filed on Sep. 3, 2019, the disclosure of which is incorporated by reference. The international application under PCT article 21(2) was not published in English.

The invention relates to a plug connector for connecting lines for liquid or gaseous media, as well as a method for establishing a plug connection between the plug connector and a mating plug connector.

A variety of plug connectors are known from WO 2018/144902 A1, WO 2018/102213 A1, and EP 3 179 148 A1. The plug connectors known from these documents have the disadvantage that it cannot be determined clearly whether the plug connectors are correctly joined together.

From EP 3 527 867 A1, WO 2011/106805 A1 and EP 2 251 581 A1, further plug connectors are known.

The object of the present invention was to overcome the shortcomings of the prior art and to provide a plug connector and a method for establishing a plug connection between the plug connector and a mating plug connector, which improve the controllability of the correct connection.

This object is achieved by means of a device and a method according to the claims.

According to the invention, a plug connector for connecting lines for liquid or gaseous media is formed. The plug connector comprises a connector body, which has at least a first casing section, which forms a receiving space for receiving a part of a mating plug connector, wherein at least two passages are formed in the first casing section;

one locking element, which is provided for securing the plug connector relative to the mating plug connector, wherein the passages in the first casing section of the connector body serve to receive the locking element. Moreover, an indicator element is formed, and a guide receptacle for receiving the indicator element in a displaceable manner is formed, wherein the indicator element is received in the guide receptacle such that the indicator element is displaceable between a rest position and an indicator position, wherein the indicator element has an indicator surface, which is visible in the indicator position of the indicator element and, in the rest position of the indicator element, is at least partially concealed, wherein the indicator surface, when it is visible, serves to signal that the plug connector is plugged into the mating plug connector correctly and/or that the locking element is locked correctly.

The plug connector according to the invention entails the surprising advantage that, due to the design according to the invention of the indicator element, it can be clearly identified whether the plug connector is plugged into the mating plug connector correctly and/or whether the locking element is locked correctly.

Moreover, it may be useful if the indicator element, in its rest position, is arranged within the guide receptacle and, in its indicator position, at least partially protrudes relative to the guide receptacle. By this measure, the indicator position of the indicator element is surprisingly easy to realize. Furthermore, this also serves to improve the easy identifiability of the indicator position of the indicator element.

Furthermore, it may be provided that the indicator element is designed such that it automatically shifts from the rest position into the indicator element when the plug connector is plugged into the mating plug connector correctly and/or when the locking element is locked correctly. This entails the advantage that this indication of a correct connection between the mating plug connector and the plug connector and/or of the correct locking of the locking element is easy to indicate.

In addition to this, it may be provided that the indicator element is arranged at a holding region of the locking element. Particularly in such an arrangement of the indicator element, it is possible to indicate when the locking element is locked correctly and, simultaneously, the plug connector is plugged into the mating plug connector correctly. Thus, maximum safety regarding the correct connection between the plug connector and the mating plug connector can be achieved by these measures.

An embodiment, according to which it may be provided that the guide receptacle is designed in the form of a guide sleeve, which is coupled, in particular welded, to the holding region of the locking element, is advantageous. Particularly in such an arrangement of the indicator element, it is possible to indicate when the locking element is locked correctly and, simultaneously, the plug connector is plugged into the mating plug connector correctly. Thus, maximum indication safety regarding the correct connection between the plug connector and the mating plug connector can be achieved by these measures.

Such a welding connection may be established, for example, by spot-welding. In this regard, the guide receptacle and the locking element may, in particular, be pressed together and admitted with electrical current.

In a further alternative, it is also conceivable that the welded connection is established, for example, by laser welding.

In an alternative embodiment variant, it is also conceivable that the guide receptacle is made from a plastic part. In this case, the guide receptacle may be connected to the locking element by means of a latching connection.

According to an advancement, it is possible that the guide receptacle is designed as a formed sheet metal part. This entails the advantage that a guide receptacle designed as a formed sheet metal part is easy to produce in a serial production and, in addition to this, can have sufficient production tolerances, so that a correct function of the indicator element can be achieved. In particular, a smooth displaceability of the indicator element in the guide receptacle can be achieved thereby.

Furthermore, it may be useful of a spring element is formed, by means of which the indicator element is preloaded in its rest position. By this measure, it can be achieved that, upon reopening the locking element and/or upon releasing the mating plug connector from the plug connector, the indicator element is urged back into its rest position and thus, it is visible that the plug connector and the mating plug connector are no longer coupled correctly.

In addition to this, it may be provided that the indicator element is coupled to an actuation region, which is greater than a groove width of a securing groove of the mating plug connector, wherein the actuation region is designed such that it abuts in an outer region of the securing groove, so that it urges the indicator element into the indicator position when all latching regions of the locking element engage with the securing groove of the mating plug connector. Particularly in such an arrangement of the indicator element, it is possible to indicate when the locking element is locked correctly and, simultaneously, the plug connector is plugged into the mating plug connector correctly. Thus, maximum safety regarding the correct connection between the plug connector and the mating plug connector can be achieved by these measures.

Moreover, it may be provided that an actuation recess is formed in the first casing section, through which actuation recess the actuation region projects into the receiving space. This entails the advantage that the indicator element, in particular the actuation region of the indicator element, can be brought into contact with the mating plug connector in order to be able to indicate the correct locking of the mating plug connector in the plug connector and/or the correct locking of the locking element.

According to a particular embodiment, it is possible that an actuation spring element is formed, by means of which the indicator element is preloaded into its indicator position, wherein the indicator element is locked in its rest position by means of a trigger mechanism. In such an embodiment variant, it can be ensured that, given the correct positioning of the mating plug connector relative to the plug connector and/or given the correct locking of the locking element, the indicator element is displaced into its indicator position.

According to an advantageous advancement, it may be provided that the trigger mechanism has a locking lug, wherein the trigger mechanism is designed such that the locking lug is actuated, and the trigger mechanism is triggered when the plug connector is plugged into the mating plug connector correctly. In such an embodiment variant, it can be ensured that, given the correct positioning of the mating plug connector relative to the plug connector and/or given the correct locking of the locking element, the indicator element is displaced into its indicator position.

In particular, it may be advantageous if the indicator surface is designed, at least in some regions, to have a corresponding signal color, such as green, and/or that a lettering, such as "OK", is arranged on the indicator surface. By these measures, it can be achieved that even a person not proficient and/or not trained is able to identify a correct locking lug of the locking element and/or a correct joining of the mating plug connector and the plug connector.

Moreover, it may be provided that the indicator element has a coding surface, which is visible in the indicator position of the indicator element and, in the rest position of the indicator element, is at least partially concealed, wherein the coding surface has a machine-readable code, such as a data matrix code. By this measure, it can be achieved that not only an optical check of the correct positioning can be carried out by the machine operator but that also a machine-readable check can be carried out and/or that the information can be stored accordingly.

Moreover, it is also conceivable that the information of the machine-readable check is stored and used for enabling and/or preventing further production steps. Hence, it can be achieved that an operator error can be largely precluded.

The indicator surface may simultaneously serve as a coding surface. Hence, the machine-readable code can be arranged directly on the indicator surface.

According to the invention, a method for establishing a plug connection between a plug connector for connecting lines for liquid or gaseous media and a mating plug connector is provided. The method comprises the method steps:

providing the plug connector with a connector body, which has at least a first casing section, which forms a receiving space for receiving a part of the mating plug connector, wherein at least two passages are formed in the first casing section, and a locking element, which is provided for securing the plug connector relative to the mating plug connector, wherein the passages in the first casing section of the connector body serve to receive the locking element;

providing the mating plug connector;

plugging the mating plug connector into the receiving space of the plug connector;

securing the mating plug connector in the s of the plug connector by means of the locking element.

Moreover, an indicator element is formed, and a guide receptacle for receiving the indicator element in a displaceable manner is formed, wherein the indicator element is received in the guide receptacle such that the indicator element is displaced from a rest position into an indicator position, when the plug connector is plugged into the mating plug connector correctly and/or when the locking element is locked correctly, wherein the indicator element has an indicator surface, which is visible in the indicator position of the indicator element and, in the rest position of the indicator element, is at least partially concealed, wherein the indicator surface, when it is visible, serves to signal that the plug connector is plugged into the mating plug connector correctly and/or when the locking element is locked correctly.

The advantage of the method according to the invention is that using an indicator element according to the invention, it can be clearly identified whether the plug connector is plugged into the mating plug connector correctly and/or whether the locking element is locked correctly.

An embodiment, according to which it may be provided that a coding surface becomes visible on the indicator element when the plug connector is plugged into the mating plug connector correctly and/or when the locking element is locked correctly, wherein a machine-readable code arranged on the coding surface is detected by means of a reader and is stored in a system for data processing, is also advantageous. By this measure, it can be achieved that not only an optical check of the correct positioning can be carried out by the machine operator but that also a machine-readable check can be carried out and/or that the information can be stored accordingly.

According to an advancement, it is possible that the indicator element automatically shifts from the indicator position back into the rest position when the locking element is opened. By this measure, it can be achieved that, upon re-opening the locking element and/or upon releasing the mating plug connector from the plug connector, the indicator element is urged back into its rest position and thus, it is visible that the plug connector and the mating plug connector are no longer coupled correctly.

Moreover, it may be provided that the indicator element is displaceable parallel to the longitudinal axis of the plug connector relative to the guide receptacle.

In an alternative embodiment variant, it may be provided that the indicator element is displaceable transversely to the longitudinal axis of the plug connector relative to the guide receptacle.

Moreover, it may be provided that the connector body comprises an annulus located between a sleeve-shaped first casing section surrounding a central longitudinal axis of the plug connector in cross-section and a sleeve-shaped second casing section of the plug connector surrounding the central longitudinal axis in cross-section, wherein the first casing section is surrounded by the second casing section, and the first casing section of the connector body is connected to the second casing section on a first end section by a first front wall section, and the casing sections are open to one another on a second end section.

Moreover, it may be provided that the indicator element is formed from a plastic material. In particular, it may be provided that the indicator element is formed as an injection-molded part. That the indicator surface of the indicator element is at least partially concealed in its rest position means that the indicator surface may be partially visible, but it is clearly identifiable that the plug connector is not yet plugged into the mating plug connector correctly and/or that the locking element is not yet locked correctly. For example, the machine-readable code may be partially concealed, so that it cannot be read.

For the purpose of better understanding of the invention, it will be elucidated in more detail by means of the figures below.

These show in a respectively very simplified schematic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
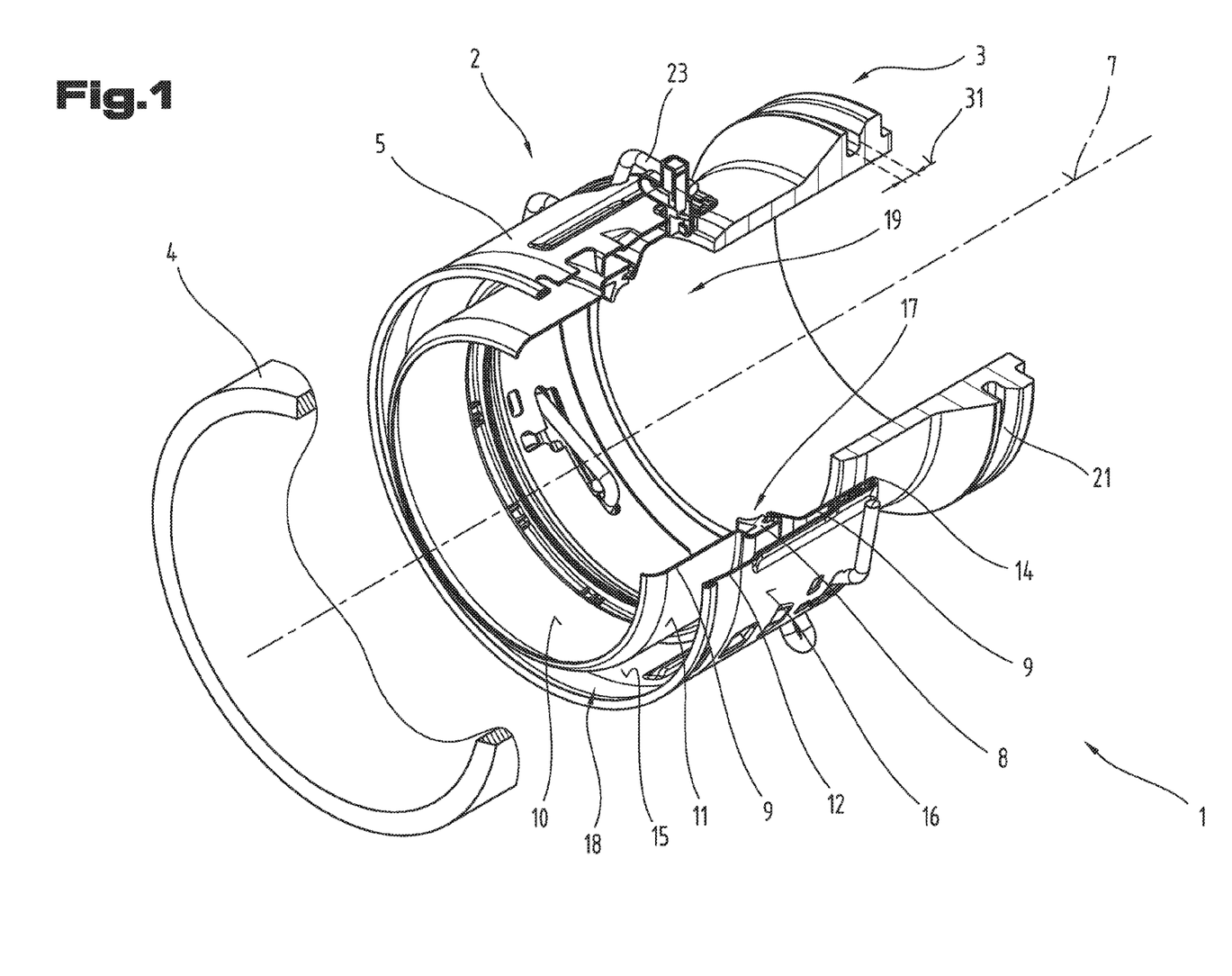
FIG. 1 a perspective view of a first embodiment variant of a plug assembly in a quarter section.

FIG. 1 shows a perspective view of a plug assembly 1 with a plug connector 2, wherein it is represented in a quarter section. FIG. 1 further schematically represents a mating plug connector 3, which can be connected to the plug assembly 1. The cooperation between the plug assembly 1 and a mating plug connector 3 is sufficiently described in AT 509 196 B1.

Moreover, a tube 4 is schematically shown, to which the plug connector 2 may be coupled. The tube 4 may, for example, be a rigid element, such as a plastic tube. In a different embodiment variant, the tube 4 may be formed as a flexible line made of a rubber material.

The plug connector 2 comprises a connector body 5, which is preferably formed as a one-piece formed part, for example a deep drawing part, in particular of a stainless steel sheet.

The plug assembly 1 is preferably used in a vehicle, in particular in a road-bound power-driven vehicle having a combustion engine, such as a car or a truck.

Of course, it is also conceivable that the plug assembly 1 is used in any other application, in particular another application in a combustion engine. This may, for example, be the use of the plug assembly 1 in a stationary aggregate, in a marine engine, in aircraft engine, in a construction machine, and so one.

In particular, the plug assembly 1 may be used for connecting different components of the fresh air supply means to the combustion engine. It can for example be provided that the plug connector 2 with the corresponding mating plug connector 3 is provided for connecting two parts in the intake area of a turbocharger. It can further also be provided, for example, that such a plug assembly 1 is used for connecting two components on the pressure side leaving the turbocharger.

Figure 2:
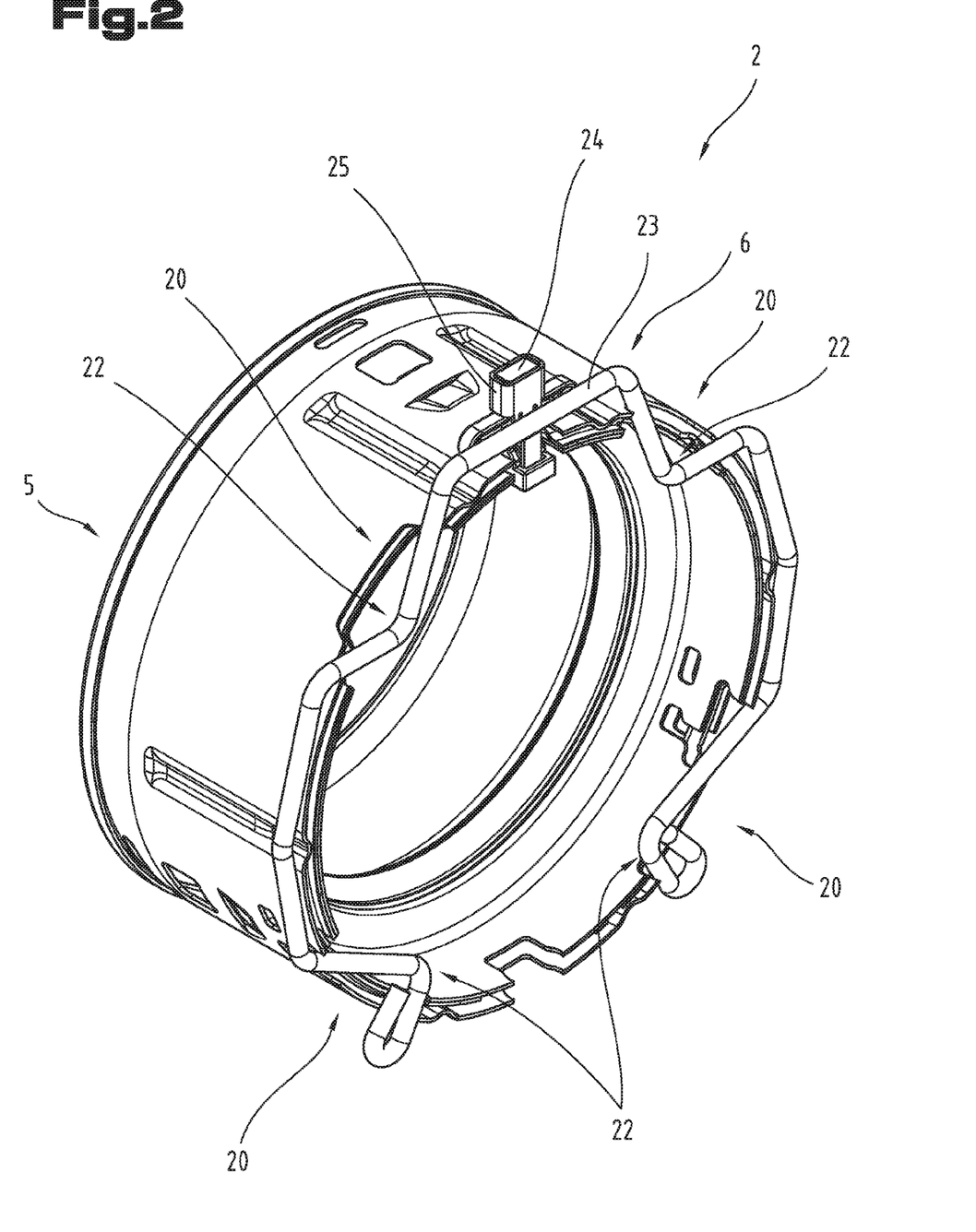
FIG. 2 a cross-section of the first embodiment variant of the plug connector with a cut in the region of the locking element.

FIG. 2 shows a cross-section of the plug connector 2, wherein the cut was selected such that a locking element 6 for securing the plug connector 2 and the mating plug connector 3 relative to one another, installed in the plug connector 2, is visible.

The locking element 6 is constructed such that it can easily be activated and deactivated such that the plug connector 2 and the mating plug connector 3 can be separated from one another and/or connected to one another as needed. The locking element 6 may be brought into a latching position, in which the plug connector 2 and the mating plug connector 3 are secured relative to one another. Moreover, the locking element 6 may be brought into a release position, in which the mating plug connector 3 can be inserted into the plug connector 2 or removed therefrom. In particular, it may be provided that the locking element 6 is designed in the form of a spring element.

It may particularly be provided that the mating plug connector 3 is formed to be rotationally symmetrical about a longitudinal axis 7 of the plug connector 2.

As can be seen well in FIG. 1, besides the connector body 5, the plug connector 2 may comprise a plug seal 8, which is accommodated in the connector body 5. The plug seal 8 serves the purpose of sufficiently sealing the plug assembly in the plugged together state with a mating plug connector 3.

As can be seen from FIG. 1, a first casing section 9, which surrounds the central longitudinal axis 7 of the plug connector 2 in a sleeve-shape, is formed on the connector body 5. In other words, the first casing section 9 is a rotationally symmetrical hollow cylinder.

The first casing section 9 comprises an inner casing face 10 and an outer casing face 11. The first casing section 9 is surrounded by a second casing section 12, which is also formed to be rotationally symmetrical with respect to the central longitudinal axis 7. The first casing section 9 is connected to the second casing section 12 on a first end section 13 by means of a first front wall section 14. The first front wall section 14 may be designed in various different ways. Particularly, it may be provided that the first front wall section 14 is designed in the form of a fold, wherein the second casing section 12 is folded by about 180° with respect to the first casing section 9, whereby the second casing section 12 is arranged so as to surround the first casing section 9.

As the first casing section 9, the second casing section 12 also has an inner casing face 15 and an outer casing face 16.

The first casing section 9 has a stepped design in the exemplary embodiment shown. In this regard, it can be provided that on the first casing section 9, on the opposite side of the first end section 13 of the plug connector 2, a seal receptacle 17, which is also formed in the connector body 5, adjoins. In such a seal receptacle 17, a plug seal 8 can be accommodated. Moreover, it may be provided that an annulus 18 for accommodating the tube 4 is formed between the first casing section 9 and the second casing section 12.

Preferably, the connector body 5 is produced in a deep drawing procedure, wherein all wall thicknesses of the casing sections of the connector body 5 may approximately have the same size.

In the region of the first casing section 9, the plug connector 2 has a receiving space 19. The receiving space 19 is surrounded by the first casing section 9 and serves to receive a part of the mating plug connector 3.

The connector body 5 has multiple passages 20 spaced apart from one another in the circumferential direction, which penetrate the first casing section 9 and, if present, also the second casing section 12. In the latching position of the locking element 6, which it assumes in the plugged in and locked state, the locking element 6 projects through the corresponding passage 20 into the receiving space 19. In these sections, the locking element 6 cooperates with a securing groove 21 of the mating plug connector 3.

In FIG. 2, it can be seen well that the locking element 6 may have, for example, four latching regions 22, which are designed for projecting through the passages 20 of the connector body 5. The latching regions 22 are therefore designed as inwardly extending V-shaped elements.

In addition to this, it may be provided that the locking element 6 has a holding region 23, by which it can be gripped so it can be inserted into the connector body 5 and so it can be moved between the latching position and the release position.

When the locking element 6 is in its latching position, the latching regions 22 project into the receiving space 19 and the mating plug connector 3 is axially secured relative to the plug connector 2. When the locking element 6 is in its release position, the latching regions 22 do not project into the receiving space 19 and the mating plug connector 3 is axially displaceable relative to the plug connector 2.

In the present exemplary embodiment of the plug connector 2, which is shown in FIGS. 1 and 2, at the holding region 23 of the locking element 6, an indicator element 24 is arranged, which serves to signal whether the locking element 6 is locked correctly. In particular, a guide receptacle 25 is formed, which serves to displaceably receive the indicator element 24. The indicator element 24 is received in the guide receptacle 25 such that the indicator element 24 is displaceable between a rest position and an indicator position.

In the representation according to FIG. 2, the indicator element 24 is in its rest position. In the representation according to FIG. 2, the indicator element 24 is in its rest position because no mating plug connector 3 is received in the receiving space 19 of the plug connector 2. As can further be seen in FIG. 2, it may be provided that the guide receptacle 25 is designed as a shaped sheet metal part, wherein the indicator element 24 is at least partially enclosed by the guide receptacle 25.

In particular, it may be provided that the guide receptacle 25 is designed as a punched part, which has two tabs, wherein the two tabs are bent to form a sleeve-shaped structure.

As can further be seen in FIG. 2, it may be provided that an actuation recess 26 is formed in the first casing section 9 or in the second casing section 12, through which actuation recess 26 an actuation region 27 formed on the indicator element 24 projects into the receiving space 19.

The actuation region 27 may be formed in one piece with the indicator element 24. In particular, it may be provided that the indicator element 24 and the actuation region 27 are formed in one piece as an injection-molded part.

Figure 3:
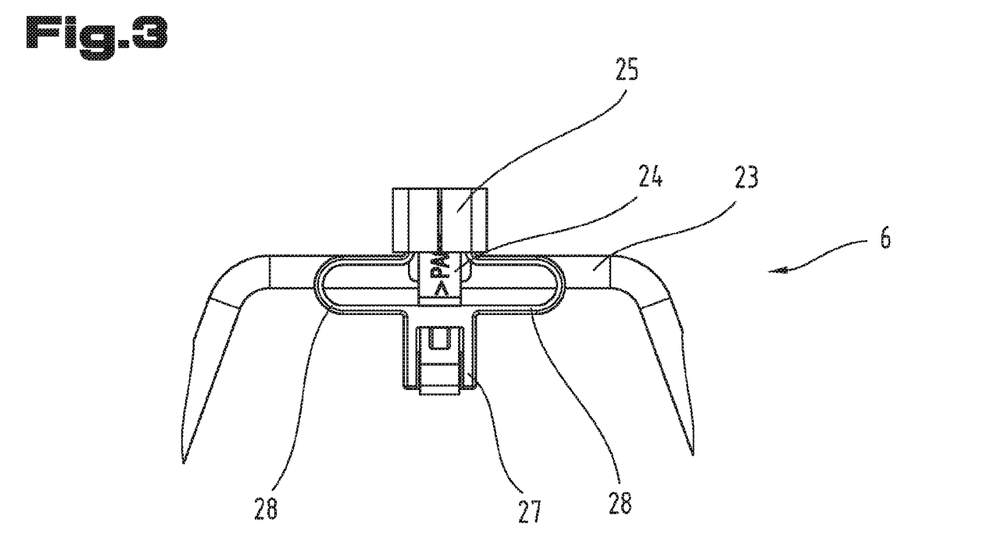
FIG. 3 a detailed view of the first embodiment variant of the plug connector, wherein an indicator element is in a rest position.

In a detailed view according to FIG. 3, the indicator element 24 is shown in its rest position. For the sake of better overview, FIG. 3 only shows the locking element 6 with the guide receptacle 25 mounted on the holding region 23, and indicator element 24.

As can further be seen in FIG. 3, it may be provided that a spring element 28 is coupled to the indicator element 24, by means of which spring element 28 the indicator element 24 is urged and/or preloaded into its rest position. The spring element 28 may also be formed in one piece with the indicator element 24.

Figure 4:
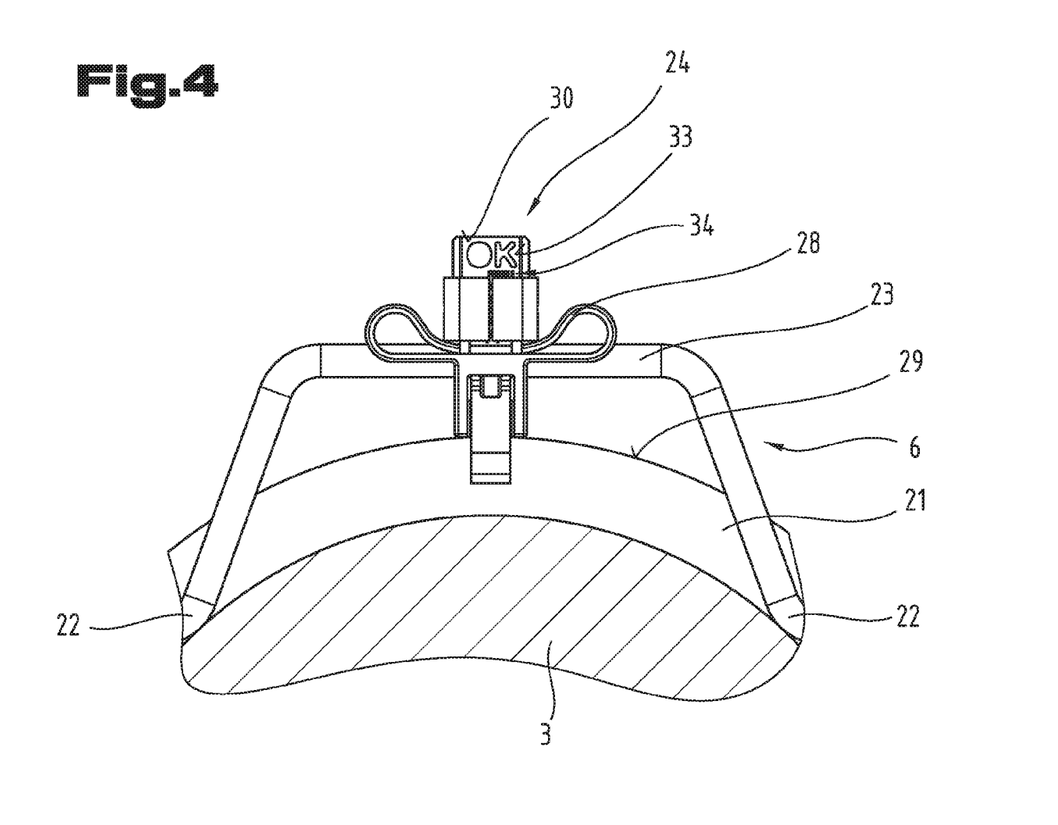
FIG. 4 a detailed view of the first embodiment variant of the plug connector, wherein the indicator element is in an indicator position.

In FIG. 4, the indicator element 24 is shown in its indicator position. To illustrate the function of the indicator element 24, FIG. 4 shows the mating plug connector 3 in a cross-sectional view in the region of the securing groove 21. As can further be seen from FIG. 4 in the view shown, the latching regions 22 of the locking element 6 are positioned in the securing groove 21 and thus, the locking element 6 is locked correctly. In this state, the actuation region 27 abuts on an outer region 29 of the mating plug connector 3, whereby the indicator element 24 is pushed into its indicator position, against the spring force of the spring element 28. The indicator element 24 is thus pushed out of the guide receptacle 25 so as to partially protrude, so that an indicator surface 30 of the indicator element 24 becomes visible.

As can further be seen in FIG. 4, it may be provided that the indicator surface 30 of the indicator element 24 simultaneously serves as a coding surface 33 on which a code 34 is arranged.

The indicator surface 30 may have a signal color, such as a green color, in order to be able to signal that the locking element 6 is locked correctly. As an alternative or in addition thereto, it is also conceivable that a lettering is arranged on the indicator surface 30, or that the indicator surface 30 is perforated accordingly by a lettering, which also signals the correct locking of the locking element 6.

The indicator element 24 being urged into its indicator position against the spring force of the spring element 28 can be achieved in that a groove width 31 of the securing groove 21 is dimensioned to be so small that the actuation region 27 of the indicator element 24 cannot be inserted into the securing groove 21.

Figure 5:
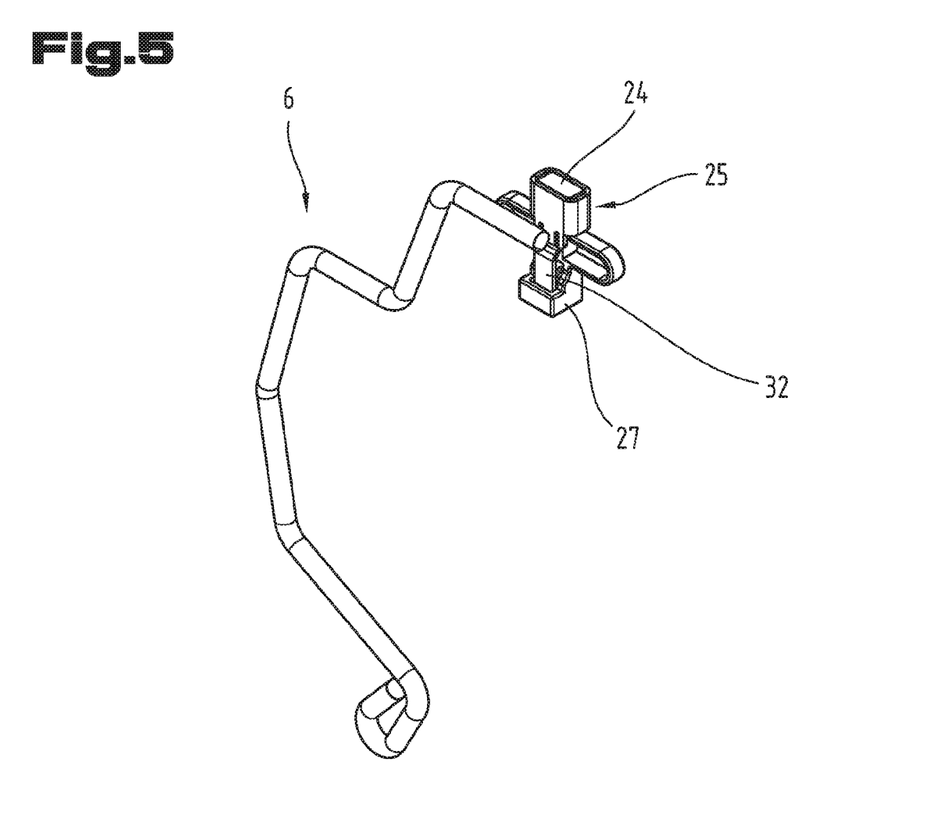
FIG. 5 a detailed view of the first embodiment variant of the plug connector, wherein the locking element is shown in a partially sectional view.

FIG. 5 shows the indicator element 24, the guide receptacle 25, and a partially sectionally shown locking element 6 in a perspective view. In the representation according to FIG. 5, the indicator element 24 is in its rest position. As can be seen well in FIG. 5, it may be provided that the guide receptacle 25 comprises a guide pin 32 which corresponds with the actuation region 27 of the indicator element 24. In particular, it may be provided that the indicator element 24 is guided in an improved manner by means of the guide pin 32.

The exemplary embodiment of the plug connector 2 shown in FIGS. 1 to 5 has the advantage that, by arranging the indicator element 24 on the locking element 6 and/or by forming the actuation region 27, it can be achieved that the indicator element 24 can only be pushed into its indicator position when, on the one hand, the plug connector is plugged into the mating plug connector 3 and, additionally, the locking element 6 is locked correctly.

In the following, the assembly of the plug connector 2 with the mating plug connector 3 is described with the aid of a combination of FIGS. 1 to 5.

In a first method step, the plug connector 2 and the mating plug connector 3 are provided, in particular, the locking element 6 is brought into position on the plug connector 2 such that the mating plug connector 3 can be plugged into the receiving space 19 of the plug connector 2 easily.

If the mating plug connector 3 is then plugged into the receiving space 19 of the plug connector 2 and is positioned correctly, the locking element 6 is brought into its latching position, so that the latching regions 22 of the locking element 6 engage with the securing groove 21 of the mating plug connector 3. In this process, the actuation region 27 comes to abut on the outer region 29 of the mating plug connector 3, whereby the indicator element 24 is urged into its indicator position and thus, the technician can detect that the plug connector is plugged into the mating plug connector correctly and the locking element 6 is locked correctly.

Figure 6:
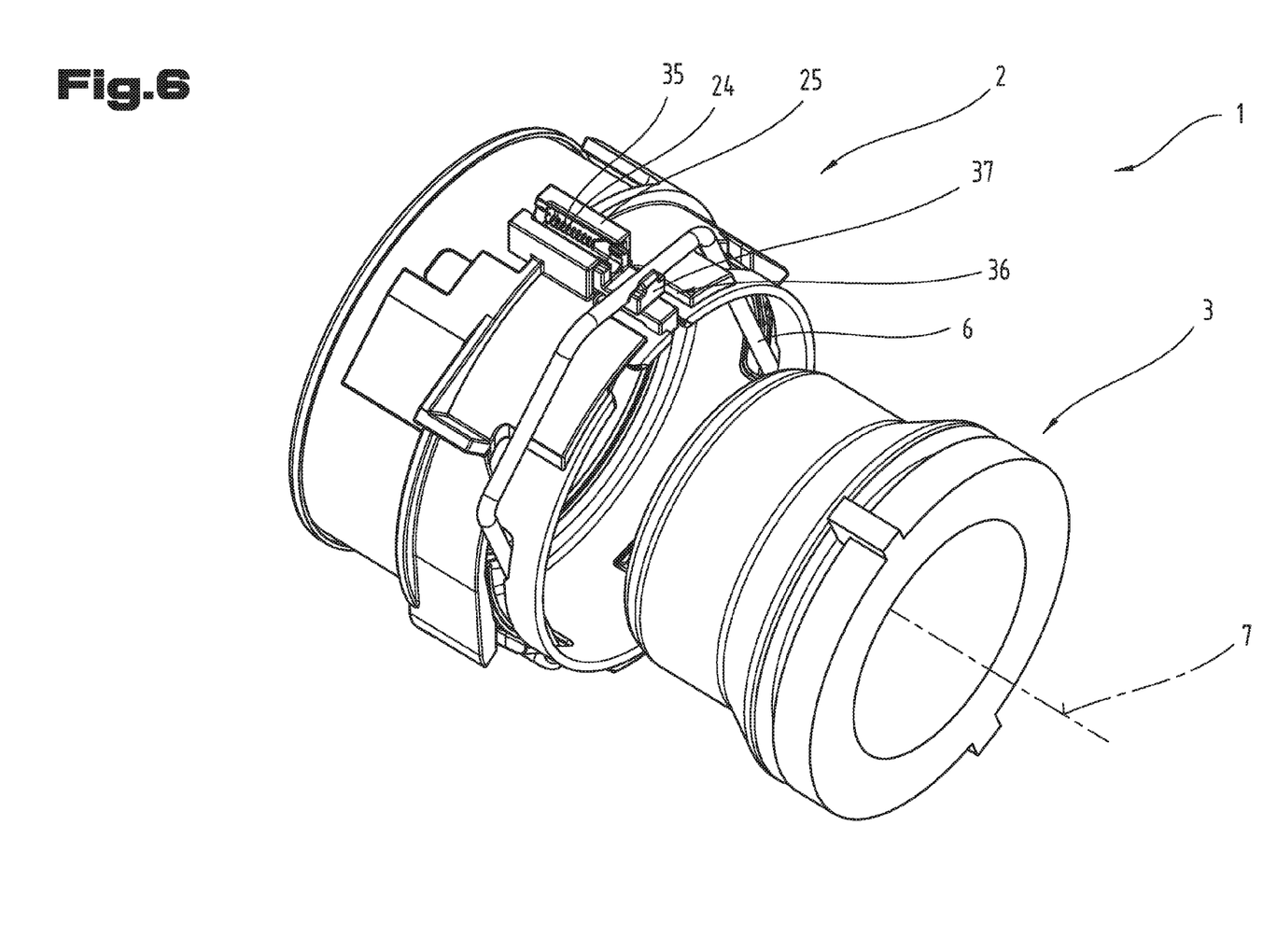
FIG. 6 a perspective view of a second embodiment variant of the plug assembly, wherein the indicator element is in its rest position.
Figure 7:
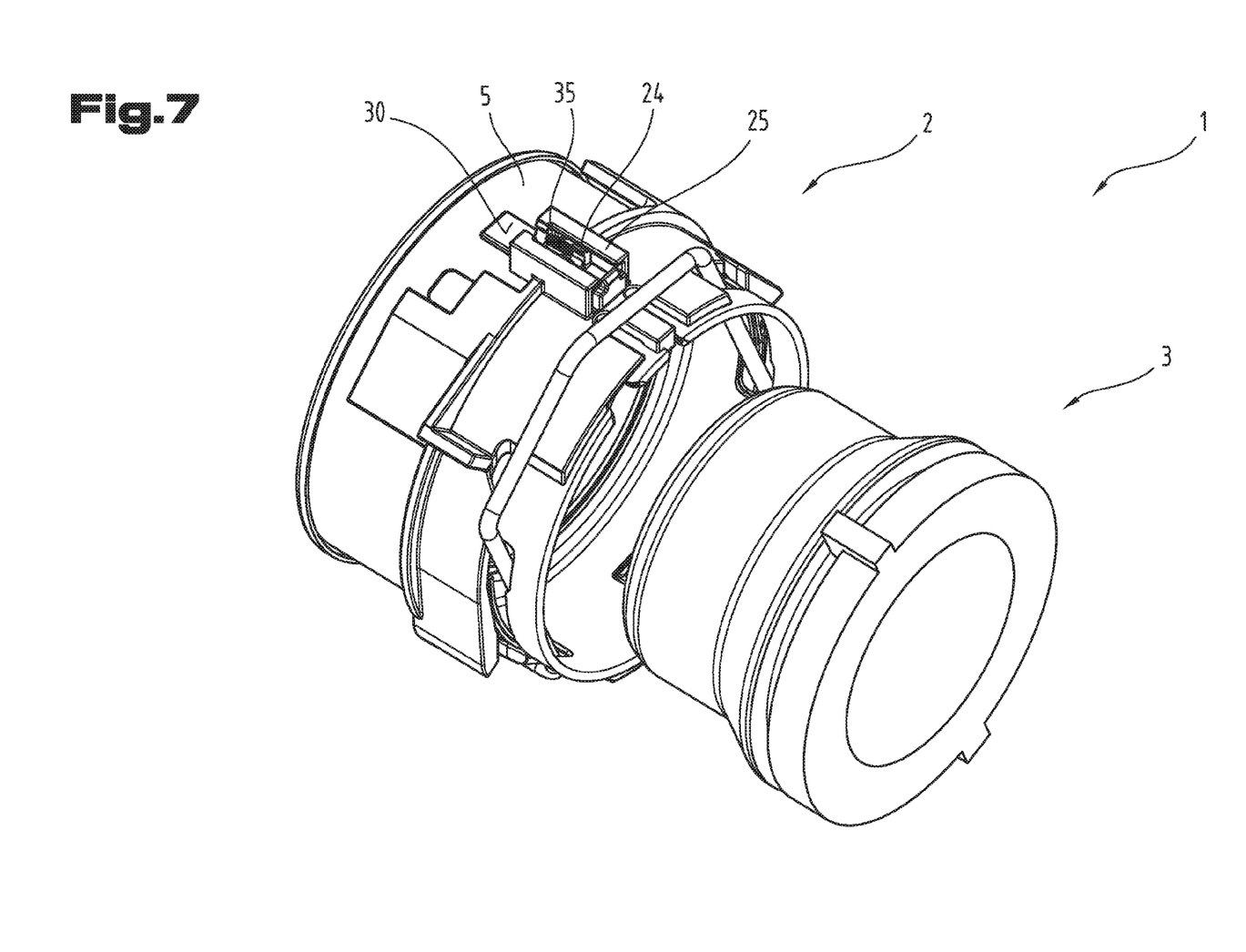
FIG. 7 a perspective view of the second embodiment variant of the plug assembly, wherein the indicator element is in its indicator position.

FIGS. 6 and 7 show a further and possibly independent embodiment of the plug assembly 1, wherein again, equal reference numbers and/or component designations are used for equal parts as in FIGS. 1 through 5 above. In order to avoid unnecessary repetitions, it is pointed to/reference is made to the detailed description in FIGS. 1 through 5 preceding it.

As can be seen in the exemplary embodiment of FIGS. 6 and 7, it may be provided that the indicator element 24 is accommodated in the guide receptacle 25 so as to be displaceable parallel to the longitudinal axis 7 of the plug connector 2. The guide receptacle 25 may, in this regard, be arranged on an outer circumference of the connector body 5 of the plug connector 2.

As can further be seen in FIGS. 6 and 7, it may be provided that an actuation spring element 35 is formed, by means of which the indicator element 24 is preloaded and/or urged into its indicator position. Moreover, it may be provided that the indicator element 24 has a trigger mechanism 36, by means of which the indicator element 24 is held in its rest position. In particular, a locking lug 37 is provided, with which the locking element 6 engages.

If the mating plug connector 3 is plugged into the plug connector 2, the locking element 6 is urged outwards, whereby it slides over the locking lug 37 of the indicator element 24.

Thereby, the indicator element 24 is released in its movement in accordance with the preloading of the actuation spring element 35, and is transferred from the rest position, as it is shown in FIG. 6, into the indicator element, as it is shown in FIG. 7. Thereby, the indicator surface 30 of the indicator element 24 becomes visible.

Figure 8:
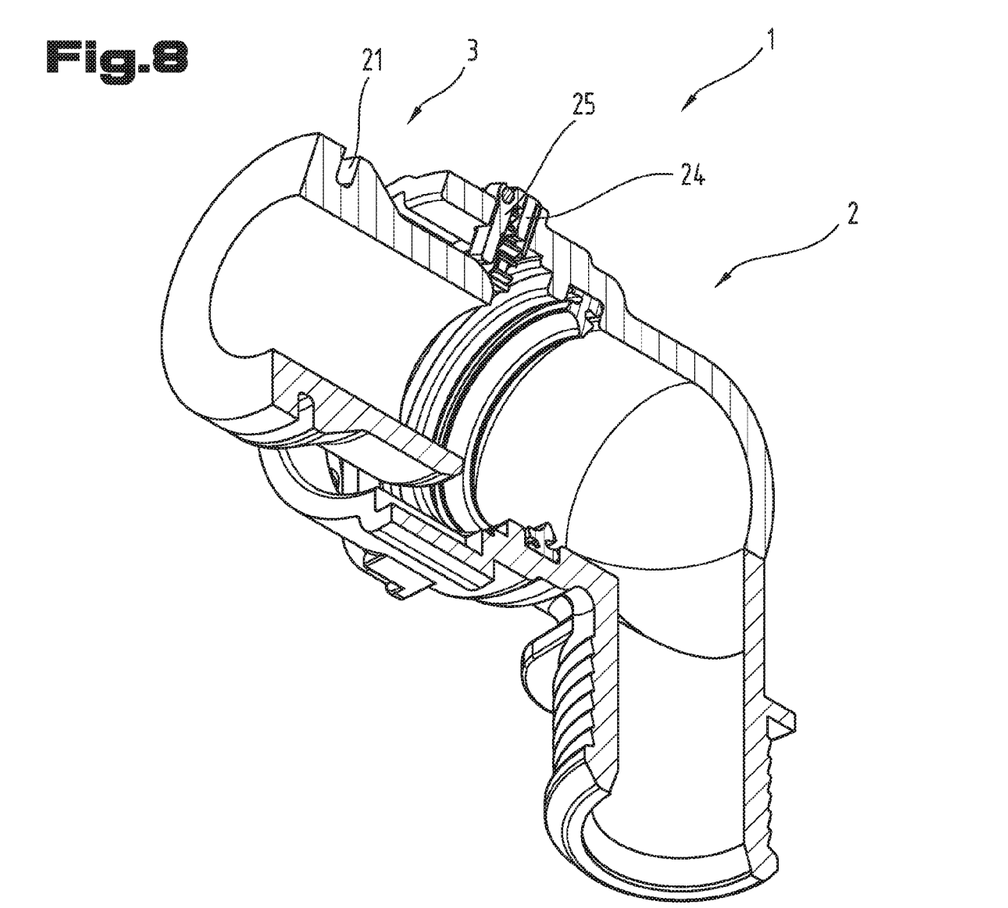
FIG. 8 a perspective view of a third embodiment variant of the plug assembly, wherein the indicator element is in its rest position.

FIG. 8 shows a further and possibly independent embodiment of the plug assembly 1, wherein again, equal reference numbers and/or component designations are used for equal parts as in FIGS. 1 through 7 above. In order to avoid unnecessary repetitions, it is pointed to/reference is made to the detailed description in FIGS. 1 through 7 preceding it.

As can be seen in FIG. 8, it may be provided that the guide receptacle 25 is arranged directly on the locking element 6 and is therefore displaceable along with the locking element 6. As in the exemplary embodiments of FIGS. 1 to 5, the indicator element 24 can be urged from its rest position into the indicator element relative to the guide receptacle 25 when the guide receptacle 25 engages with the securing groove 21 of the mating plug connector 3.

In the exemplary embodiment according to FIG. 8, it may be provided that the guide receptacle 25 is formed from a plastic part. In this case, the guide receptacle 25 may be connected to the locking element 6 by means of a latching connection.

Figure 9:
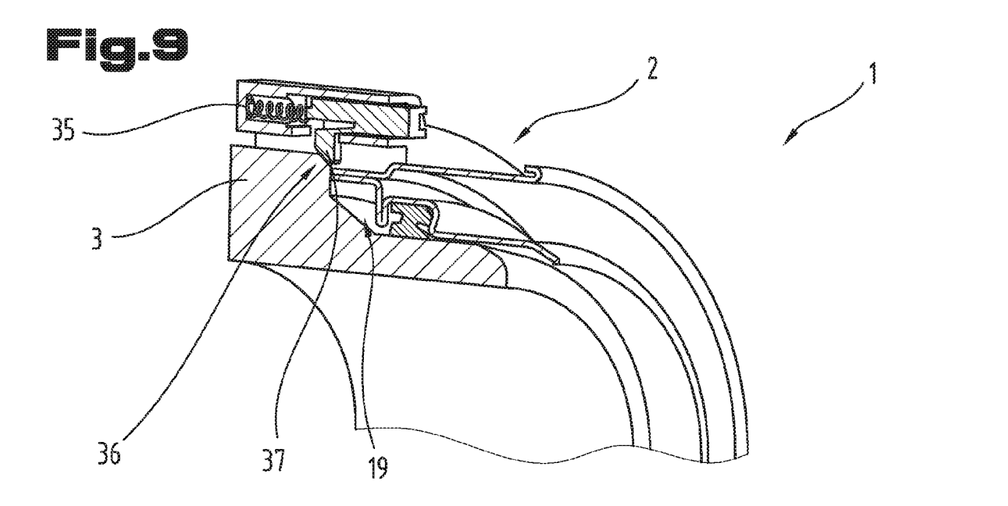
FIG. 9 a perspective view of a fourth embodiment variant of the plug assembly, wherein the indicator element is in its indicator position.

FIG. 9 shows a further and possibly independent embodiment of the plug assembly 1, wherein again, equal reference numbers and/or component designations are used for equal parts as in FIGS. 1 through 8 above. In order to avoid unnecessary repetitions, it is pointed to/reference is made to the detailed description in FIGS. 1 through 8 preceding it.

As can be seen in FIG. 9, it may be provided that the locking lug 37 of the trigger mechanism 36 of an indicator element 24 preloaded by means of the actuation spring element 35 projects into the receiving space 19 and, upon plugging in, is activated by the mating plug connector 3, so that the indicator element 24 is transferred from its rest position into the indicator position. In this regard, the actuation spring element 35 is designed as a tension spring which preloads the indicator element 24 in its rest position.

The indicator element 24 is displaced into its indicator position by pressing the mating plug connector 3 onto the locking lug 37.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

| List of reference numbers | |
|---|---|
| 1 | Plug assembly |
| 2 | Plug connector |
| 3 | Mating plug connector |
| 4 | Tube |
| 5 | Connector body |
| 6 | Locking element |
| 7 | Longitudinal axis of the plug connector |
| 8 | Plug seal |
| 9 | First casing section |

-continued

List of reference numbers

| | |
|---|---|
| 10 | Inner casing face |
| 11 | Outer casing face |
| 12 | Second casing section |
| 13 | First end section plug connector |
| 14 | Front wall section |
| 15 | Inner casing face |
| 16 | Outer casing face |
| 17 | Seal receptacle of plug connector |
| 18 | Annulus |
| 19 | Receiving space |
| 20 | Passage |
| 21 | Securing groove |
| 22 | Latching region |
| 23 | Holding region |
| 24 | Indicator element |
| 25 | Guide receptacle |
| 26 | Actuation recess |
| 27 | Actuation region |
| 28 | Spring element |
| 29 | Outer region |
| 30 | Indicator surface |
| 31 | Groove width |
| 32 | Guide pin |
| 33 | Coding surface |
| 34 | Code |
| 35 | Actuation spring element |
| 36 | Trigger mechanism |
| 37 | Locking lug |

The invention claimed is:

1. A plug connector for connecting lines for liquid or gaseous media, comprising
a connector body, which has at least a first casing section, which forms a receiving space for receiving a part of a mating plug connector, wherein at least two passages are formed in the first casing section;
a locking element, which is provided for securing the plug connector relative to the mating plug connector, wherein the passages in the first casing section of the connector body serve to receive the locking element, wherein an indicator element is formed, and wherein a guide receptacle for receiving the indicator element in a displaceable manner is formed, wherein the indicator element is received in the guide receptacle such that the indicator element is displaceable between a rest position and an indicator position, wherein the indicator element has an indicator surface, which is visible in the indicator position of the indicator element and, in the rest position of the indicator element, is at least partially concealed, wherein the indicator surface, when the indicator surface is visible, serves to signal that the plug connector is plugged into the mating plug connector correctly, and that the locking element is locked correctly, wherein the locking element is connected to the indicator element such that the indicator element serves to signal that the locking element is locked correctly, wherein the guide receptacle is designed in the form of a guide sleeve, which is coupled to a holding region of the locking element, wherein the indicator element, in the rest position, is arranged within the guide receptacle and, in the indicator position, at least partially protrudes relative to the guide receptacle, wherein the indicator element is coupled to an actuation region, which is greater than a groove width of a securing groove of the mating plug connector, wherein the actuation region is designed such that the actuation region abuts in an outer region of the securing groove, so that the actuation region urges the indicator element into the indicator position when all latching regions of the locking element engage with the securing groove of the mating plug connector.

2. The plug connector according to claim 1, wherein the indicator element is designed such that the indicator element automatically shifts from the rest position into the indicator element when the plug connector is plugged into the mating plug connector correctly and/or when the locking element is locked correctly.

3. The plug connector according to claim 1, wherein the indicator element is arranged on the holding region of the locking element.

4. The plug connector according to claim 1, wherein the guide receptacle is formed as a formed sheet metal part.

5. The plug connector according to claim 1, wherein a spring element is formed, by means of which the indicator element is preloaded into the rest position.

6. The plug connector according to claim 5, wherein an actuation recess is formed in the first casing section, wherein the actuation region projects through the actuation recess into the receiving space.

7. The plug connector according to claim 1, wherein an actuation spring element is formed, by means of which the indicator element is preloaded into the indicator position, wherein the indicator element is locked in the rest position by means of a trigger mechanism.

8. The plug connector according to claim 7, wherein the trigger mechanism has a locking lug, wherein the trigger mechanism is designed such that the locking lug is actuated and the trigger mechanism is triggered when the plug connector is plugged into the mating plug connector correctly.

9. The plug connector according to claim 1, wherein the indicator surface is designed, at least in some regions, to have a corresponding signal color and/or wherein a lettering is arranged on the indicator surface.

10. The plug connector according to claim 1, wherein the indicator element has a coding surface, which is visible in the indicator position of the indicator element and, in the rest position of the indicator element, is at least partially concealed, wherein the coding surface has a machine-readable code.

11. A method for establishing a plug connection between a plug connector for connecting lines for liquid or gaseous media and a mating plug connector, comprising the method steps:
providing the plug connector with a connector body, which has at least a first casing section, which forms a receiving space for receiving a part of the mating plug connector, wherein at least two passages are formed in the first casing section, and a locking element, which is provided for securing the plug connector relative to the mating plug connector, wherein the passages in the first casing section of the connector body serve to receive the locking element;
providing the mating plug connector;
plugging the mating plug connector into the receiving space of the plug connector;
securing the mating plug connector in the receiving space of the plug connector by means of the locking element, wherein an indicator element is formed, and wherein a guide receptacle for receiving the indicator element in a displaceable manner is formed, wherein the indicator element is received in the guide receptacle such that the indicator element is displaced from a rest position into an indicator position when the plug connector is plugged into the mating plug connector correctly and when the locking element is locked correctly, wherein the indicator element has an indicator surface, which is visible in the indicator position of the indicator element and, in the rest position of the indicator element, is at least partially concealed, wherein the indicator surface, when the indicator surface is visible, serves to signal that the plug connector is plugged into the mating plug connector correctly, and that the locking element is locked correctly, wherein the locking element is connected to the indicator element such that the indicator element serves to signal that the locking element is locked correctly.

12. The method according to claim 11, wherein a coding surface becomes visible on the indicator element when the plug connector is plugged into the mating plug connector correctly and/or when the locking element is locked correctly, wherein a machine-readable code arranged on the coding surface is detected by means of a reader and is stored in a system for data processing.

13. The method according to claim 11, wherein the indicator element automatically shifts from the indicator position back into the rest position when the locking element is opened.

14. The plug connector according to claim 9, wherein the signal color is green.

15. The plug connector according to claim 9, wherein the lettering is "OK".

16. The plug connector according to claim 10, wherein the machine-readable code is a data matrix code.

* * * * *